Nov. 28, 1961 A. AHRENS 3,011,082

CONDUCTOR BAR FOR ELECTRICAL MACHINES

Filed April 12, 1957

ALFRED AHRENS
*INVENTOR.*

*BY* Karl F. Ross
AGENT 3,011,082

CONDUCTOR BAR FOR ELECTRICAL MACHINES

Alfred Ahrens, Geislerpfad 16, Berlin-Siemensstadt, Germany

Filed Apr. 12, 1957, Ser. No. 652,524
10 Claims. (Cl. 310—64)

Figure 2:
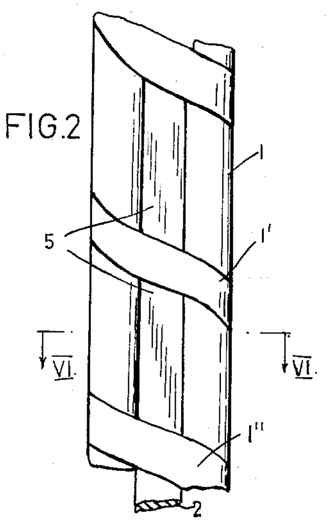

To eliminate or reduce the eddy-current losses in the slot bars particularly of large electrical machines, lattice bars are used; such a bar is composed of individual conductors which extend with opposed inclination at the two flat sides of the rectangular cross-section of the bar and pass at the narrow sides from one side of the bar to the other side thereof on account of the offset of the individual conductor so that this conductor rises on one flat side of the bar from the bottom of the slot to the air gap, whereupon it passes at the point of bend to the other flat side and then drops askew to the bottom of the slot. The production of the lattice rod is effected by bringing the individual conductors per se into their final shape by offsetting them in suitable pressing apparatus, whereupon the individual conductors are assembled to form the entire bar.

The invention relates to such a lattice bar, wherein, furthermore, spaces are provided for the axial flow of a coolant in the interior of the bar, i.e. between the two flat sides formed by individual conductors. According to the invention, the two flat sides of the lattice bar are arranged spaced from each other side by side by means of a deeper bend of the individual conductors, and one or several axial channels are provided in this spacing in order to pass a coolant therethrough. According to the invention, furthermore, the individual conductors of the lattice bar are assembled to form a rigid unit by cementing with a synthetic resin which may be cured and does not contain solvents. The individual conductors in the hitherto known lattice bars are likewise reinforced by bonding to a bar unit with a curable synthetic resin. In these prior instances, however, use is made not of a solvent-free, curable synthetic resin but of the known Bakelite resin, wherein the liquid Bakelite lacquer is combined with spirit as a solvent. In curing, the spirit must be removed by evaporating or volatilizing from this liquid Bakelite lacquer, whereupon the Bakelite lacquer is cured too. In contradistinction thereto, the bar according to the invention is to be bonded by means of a curable synthetic resin or lacquer containing no solvents or, at least, no volatile solvents. For cementing the individual conductors of the bar according to the invention, thermosetting materials such as the epoxide or ethoxyline resins are suitable, e.g. the curable resins known as "Araldit," or polyester resins which are dissolved in hydrocarbons, such as styrene. In the setting of these latter resins, the solvent does not evaporate, but all molecules partake of the thermal polymerization so that the total composition solidifies to a unitary structure. When these resins are cured, no gases at all are released from the resin. To bond the individual conductors with the cited synthetic resins affords the advantage over the hitherto usual bonding by means of Bakelite resins that the strength of the total bar after curing is considerably higher. This is of great importance particularly for the cooling spaces extending in the interior of the bar since these cooling channels may now be of larger rectangular cross-section without any risk of a displacement of the individual conductors at the operational stresses of the bar.

Any of the known liquid or gaseous cooling fluids (e.g. oil; air or hydrogen at or above atmospheric pressure) may be used as a coolant for the channels of the bar. In spite of its assembly from individual conductors, the new lattice bar shows great stability, the coolant efficiently removing in the axial channels the heat generated in the bar since the cooling channels are disposed directly adjacent the individual conductors of the bar.

Figure 4:
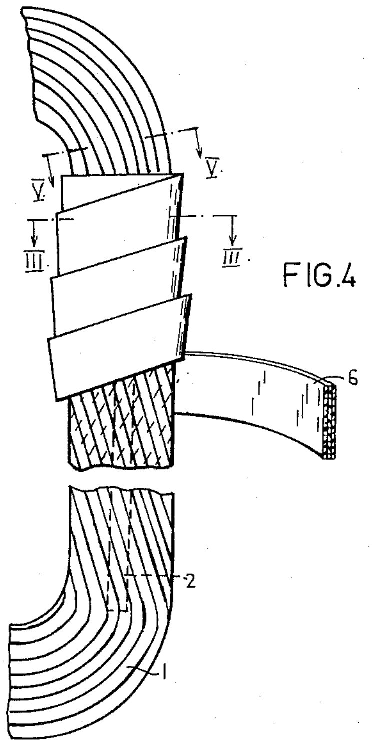
Figure 3:
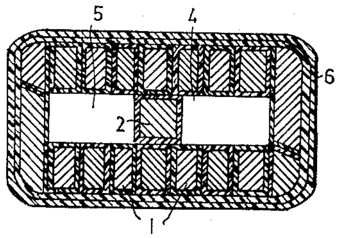
Figure 1:
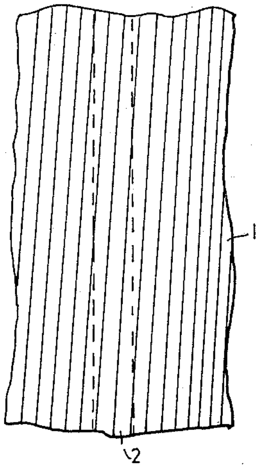

The invention is explained more in detail on basis of the embodiment shown in the drawing in which:

FIG. 1 shows a fragmentary elevational view of the flat major side of the lattice bar; FIG. 2 shows a similar view of the narrow side; FIG. 3 shows a cross-section of the bar taken on line III—III of FIG. 4; FIG. 4 is an overall view of the bar seen from the same side as FIG. 1; and FIGS. 5 and 6 are cross-sectional views taken respectively on line V—V of FIG. 4 and on line VI—VI of FIG. 2.

It is apparent from the drawing that the flat sides of the lattice bar are assembled from individual conductors 1 arranged side by side, these individual conductors extending in inclined relation along the bar so that they pass from one narrow side to the other narrow side in the course of the bar. As may be seen in FIG. 2, the individual conductors are offset at the narrow sides by effecting a double bend to opposite sides, so that they pass from one flat side of the bar to the other and extend there again in inclined direction but with opposed inclination. The offset of the individual conductors at the narrow sides has such depth, according to FIG. 2, that an interspace 3 is created between the two flat sides formed by the individual conductors. A coolant may now be passed through this interspace in the direction of the axis of the bar. The individual conductors 1 of the bar, wrapped in glass-silk tape, are connected by cementing with the aforementioned synthetic resin to form a rigid unit. In order to further reinforce the bar, an axially extending intermediate element 2 is inserted in the medial portion of the interspace 3, whereby two cooling channels 4 and 5 are created which extend alongside each other in the direction of the height of the bar. The intermediate element or spacer 2 in the illustrated embodiment consists, in a manner similar to the individual conductor 1, of a copper conductor which is surrounded for insulation with a fabric of glass silk and which is adhered to the individual conductors of the side walls by means of the aforementioned curable synthetic resin. The intermediate element, however, may also be hollow and made of an insulating material while being likewise retained in its position by cementing.

Figure 5:
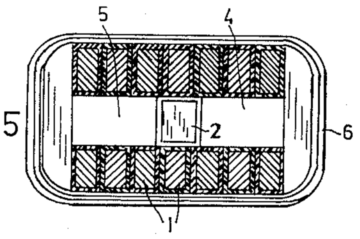
Figure 6:
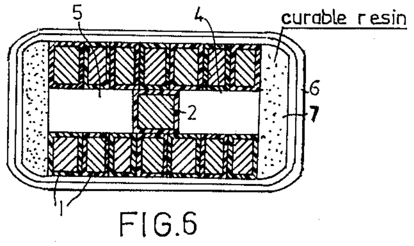

The completed lattice bar, as best shown in FIGS. 3, 5 and 6, is surrounded also by the insulating sleeve 6. This insulating sleeve may, likewise, be produced in using a solvent-free curable synthetic resin or a resin of this type containing no volatile solvent. The insulating sleeve may be made for instance by applying several layers of mica sheets separated by intermediate layers of solvent-free curable synthetic resin onto a heat-stable backing of a fabric (particularly glass silk) or a fibrous material (particularly India paper) or a foil, and by winding the multi-foil tape thus produced advantageously in several layers, one on top of the other, around the lattice bar, and then curing. The lattice bare, however, may also be wrapped up in known manner in repeated helical windings of a tape which comprises two layers of India paper between which mica sheets are bonded by means of a thermoplastic adhesive. The bar is dried after wrapping and then soaked with a fluid synthetic resin in the vacuum and then cured.

It is possible now to combine the production of the lattice bar according to the invention with the production of the insulating sleeve in one operation by producing the insulating sleeve approximately in the described manner on the bar after having applied the solvent-free fluid synthetic resin between the individual conductors, thus between the short legs 1', 1'' thereof (FIG. 2) as illustrated at 7 in FIG. 6, or having it soaked with it and by then curing jointly the solvent-free fluid synthetic resin for the lattice bar and the insulating sleeve. The manufacturing procedure of the entire lattice bar provided with an insulating sleeve is effected then by first assembling the partial conductors which are provided already with offsets and are wrapped, inserting also the intermediate element 2 and inserting mandrels greased with silicone fat into the cooling channels 4 and 5 to maintain these free. Thereupon, the lattice bar is coated or soaked with the fluid synthetic resin. Subsequently, the insulating sleeve on the bar is produced; it is possible to work in such manner that layers of the solvent-free fluid synthetic resin and layers of mica sheets are applied in succession by coating, spraying or the like onto an outspread backing (preferably of glass silk), whereupon this multi-foil tape is wound about the lattice bar preferably by means of a suitable machine. Upon applying pressure and heat, both the synthetic resin between the individual conductors of the lattice bar and the synthetic resin in the insulating sleeve are cured, for which purpose the lattice bar is surrounded by a press mold to assure accuracy to size and then heated. After the bar has been cured, the aforementioned mandrels are removed from the bar so that the channels are free for the passage of the coolant.

I claim:

1. A conductor bar for electrical machines, comprising a self-supporting structure composed of a series of double-bent elongated conductor members, insulating means individually surrounding said members, and bonding means uniting said members to a tubular body of substantially rectangular cross-section; each of said members having a first leg extending on one of the major faces of said body at a relatively small inclination to the axial direction of said body, a second leg extending across one of the minor faces of said body at a relatively large inclination to said axial direction and in spaced relationship to corresponding legs of other of said members, and a third leg extending on the other major face of said body at an inclination to said axial direction opposite that of said first leg, said second leg being long enough to maintain said first and third legs spaced from each other, said bonding means comprising a hardenable synthetic resin free from volatile solvents in its non-hardened condition, said resin occupying the spaces separating said corresponding legs on said minor faces while leaving free at least one axially extending channel in the interior of said body, the inner surfaces of the insulated conductor members being freely exposed to the atmosphere in said channel.

2. A conductor bar according to claim 1 wherein said resin is an epoxide.

3. A conductor bar for electrical machines, comprising a series of double-bent elongated conductor members, bonding means uniting said members to a tubular body of substantially rectangular cross-section, and at least one elongated spacer extending in axial direction within said body and dividing the interior thereof into a plurality of axially extending compartments; each of said members having a first leg extending on one of the major faces of said body at a relatively small inclination to the axial direction of said body, a second leg extending across one of the minor faces of said body at a relatively large inclination to said axial direction and in spaced relationship to corresponding legs of other of said members, and a third leg extending on the other major face of said body at an inclination to said axial direction opposite that of said first leg, said second leg being long enough to maintain said first and third legs spaced from each other by a distance equal to the thickness of said spacer; said bonding means comprising a hardenable synthetic resin free from volatile solvents in its non-hardened condition, said resin occupying the spaces separating said corresponding legs on said minor faces while leaving said compartments free, the inner surfaces of the insulated conductor members being freely exposed to the atmosphere in said compartments.

4. A conductor bar according to claim 3 wherein said spacer comprises a copper rod provided with an insulating covering.

5. A method of making a conductor bar for electrical machines which comprises assembling a plurality of double-bent, elongated conductor members, each having a pair of main legs extending skew to each other in parallel planes and a connecting leg between said main legs extending in a plane transverse to said parallel planes into a tubular body of substantially rectangular cross-section, with said main legs extending on opposite major faces of said body and said connecting leg extending across a minor face thereof, bonding said members together by means of a thermosetting resin free from volatile solvents, providing at least one axial channel within said body by introducing into its interior at least one removable mandrel preventing the entrance of said resin, curing said resin by the application of heat and pressure to said body and withdrawing said mandrel.

6. The method according to claim 5, comprising the further step of permanently subdividing the interior of said body into a plurality of axially extending compartments by inserting at least one elongated spacer in said body and bonding said spacer to said body by means of said resin, each of said compartments receiving a respective mandrel.

7. A conductor bar according to claim 1 wherein the width of said channel is substantially equal to the thickness of each of said conductor members.

8. A conductor bar according to claim 3 wherein said spacer has a thickness substantially equal to that of each of said conductor members.

9. A conductor bar according to claim 3 wherein said resin is an epoxide.

10. The method according to claim 5 wherein said resin is an epoxide.

References Cited in the file of this patent

UNITED STATES PATENTS

| | | |
|---|---|---|
| 1,144,252 | Roebel | June 22, 1915 |
| 1,645,296 | Rudenberg | Oct. 11, 1927 |
| 2,581,862 | Johnson | Jan. 8, 1952 |
| 2,705,292 | Wagenseil | Mar. 29, 1955 |
| 2,707,204 | Richardson et al. | Apr. 26, 1955 |
| 2,780,739 | Baudry et al. | Feb. 5, 1957 |
| 2,830,208 | Staats | Apr. 8, 1958 |
| 2,831,991 | Perkins | Apr. 22, 1958 |

FOREIGN PATENTS

| | | |
|---|---|---|
| 525,231 | Belgium | Jan. 15, 1954 |

OTHER REFERENCES

Text Book: "Electrical Insulation," by G. L. Moses, published by McGraw-Hill Book Co., New York, N.Y., pages 89 and 90.